United States Patent [19]
Koizumi

[11] Patent Number: 4,821,618
[45] Date of Patent: Apr. 18, 1989

[54] ACTION-SUPPORTING ARRANGEMENT IN PIANO

[75] Inventor: Shinsaku Koizumi, Hamamatsu, Japan

[73] Assignee: Kabushiki Kaisha Kawai Gakki Seisakusho, Hamamatsu, Japan

[21] Appl. No.: 112,724

[22] Filed: Oct. 23, 1987

Related U.S. Application Data

[63] Continuation-in-part of Ser. No. 920,504, Oct. 17, 1986, abandoned, Continuation of Ser. No. 635,296, Jul. 27, 1984, abandoned.

[51] Int. Cl.$^4$ .............................................. G01C 3/18
[52] U.S. Cl. ................................................... 84/250
[58] Field of Search ................ 84/184, 185, 187, 188, 84/177, 250, 299, 430, 423 R

[56] References Cited

U.S. PATENT DOCUMENTS 844,985 2/1907 Wuest, Jr. ........................ 84/188 X
4,069,733 1/1978 Quan .................................. 84/299
4,127,051 11/1978 Conklin, Jr. ........................ 84/430

*Primary Examiner*—L. T. Hix
*Assistant Examiner*—Brian W. Brown
*Attorney, Agent, or Firm*—Abelman, Frayne, Rezac & Schwab

[57] ABSTRACT

The action mechanism of a piano is supported directly from a back structure of the piano and is adjustable relative to strings of the piano prior to assembly of the complete piano, the supports for the action mechanism being attached directly to back posts of the back structure, which act to absorb noises created in the action mechanism and inhibit the transmission of vibrations and noises produced in the action mechanism to the strings and soundboard of the piano.

3 Claims, 4 Drawing Sheets

ACTION-SUPPORTING ARRANGEMENT IN PIANO

This Application is a continuation in part of parent application No. 635,296, filed July 27, 1984 (now abandoned) and Rule 60 continuation application No. 920504, filed Oct. 17, 1986 (now abandoned).

This invention relates to an action-supporting arrangement in a piano, especially, in an upright piano.

BACKGROUND OF THE INVENTION

A conventional upright piano is assembled in the manner illustrated in FIG. 1. A pair of right and left end panels g, g having right and left arms f, f fixed thereto are attached to a back structure 3 comprized of a back post assembly body a composed of back posts, upper and lower beams and other members. A soundboard b is attached to the assembly body a, a frame d applied with strings c is attached to the assembly body a, and a key bed h is then bridged between and connected to the right and left arms f, f. A pair of right and left action bracket bases j, j are mounted on and connected to the key bed h, and an action means k is supported on those bases j, j through respective bolts i, i engaged therewith so as to be opposite to the frame d. Dampers and hammers are then attached to the action means k, and a back rail n and a keyboard 0 are provided in their respective positions on the key bed h. Furthermore, the keyboard o is adjusted in height as are other parts, and thereafter casing members (not illustrated) such as an upper front panel, a lower front panel, a top panel, etc., are attached.

The piano thus assembled, however, frequently suffers from problems of alignment of some of the parts. Because the action means k is supported on the key bed h through the action bracket bases j, j an alignment error is caused when the end panels g, g are attached to the back structure e, and another error is caused when the key bed h is attached to the arms f, f of the end panels g, g. After the action means k is attached to the arms f, f of the end panels g, g as mentioned above, adjustments are necessary in order to compensate for the cumulative postional errors, in order that each hammer will accurately strike a corresponding string at a closely determined position. Additionally, since there are many assembling steps from the time when the right and left end panels g, g are attached to the back structure e to the time when the casing members are attached, it is innevitable that these assemblying steps must be carried out in succession, and the probability becomes increasingly great that the coated surfaces of the end panels g, g and other parts may be injured inadvertently with a tool used for the assembling work. Furthermore, it takes a much longer time to manufacture the piano. Additionally, since the end panels g, g with the arms f, f to which the action means k is to be attached must be prepared at an early stage of the assembling process, the production of the piano is slowed and accordingly the production cost becomes high.

It has been previously proposed, for example in Wuest U.S. Pat. No. 844,985, issued Feb. 19, 1907, to support the action means of an automated player piano directly from the metal frame of the piano. While this facilitates accurate positioning of the hammers relative to the strings, it also results in vibrations and other noises produced in the action means being fed directly into the frame, and in turn into the strings, and ultimately into the soundboard via the bridge of the piano, and gives rise to spurious noises in the playing of the piano and a degradation of its tonal quality.

SUMMARY OF THE INVENTION

This invention has for its object to provide an action-supporting arrangement in a piano which is free from the foregoing inconveniences, and is characterized in that a pair of right and left action supporting members are attached directly to a front surface of a back structure comprised of a back post assembly body, and a soundboard and frame attached to the assembly body, at a position spaced laterally from the frame, such that vibrations and noises produced in the action mechanism are transmitted directly into back posts of the back structure and are absorbed therein, and thus are effectively isolated from the frame, the strings, the bridge, and the sound board. Further, as the action supporting members are attached directly to the back post structure, they can be attached to that structure with high postional accuracy, and, as they support the action mechanism directly without any interventing support members, cumulative positional errors of the piror art structure are eliminated in their entirity.

DESCRIPTION OF THE PREFERRED EMBODIMENT

Figure 1:
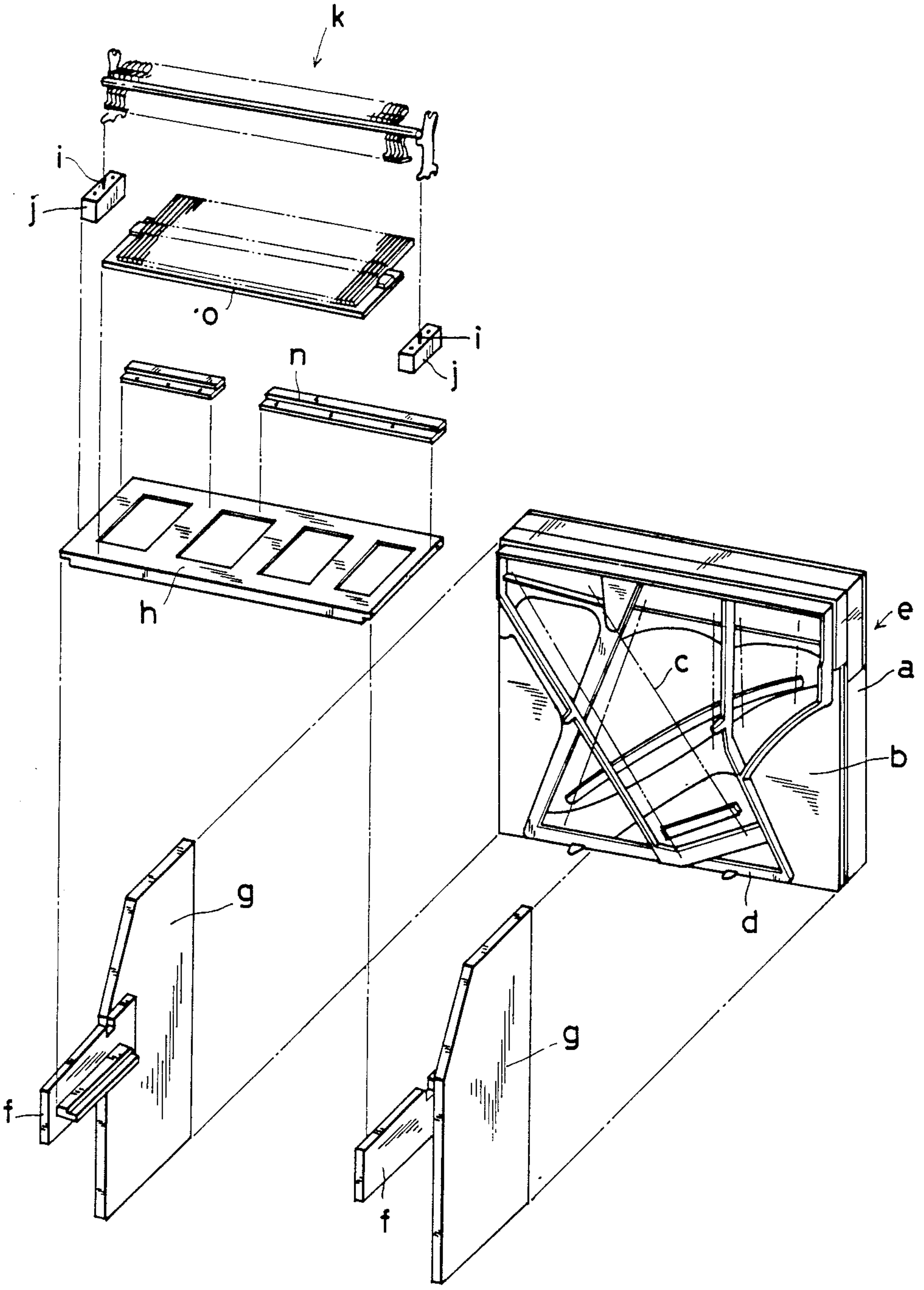
FIG. 1 PRIOR ART
FIG. 1 is an exploded perspective view of a conventional prior art upright piano.
Figure 2:
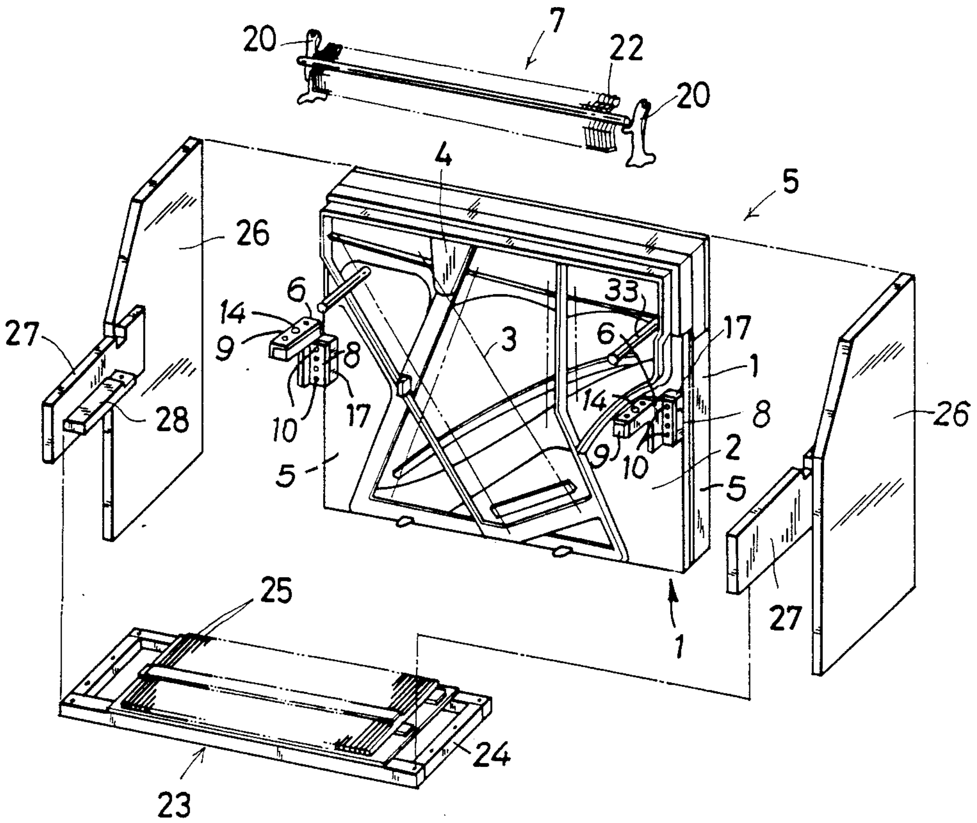
FIG. 2 is an exploded perspective view of a piano embodying the present invention.
Figure 3:
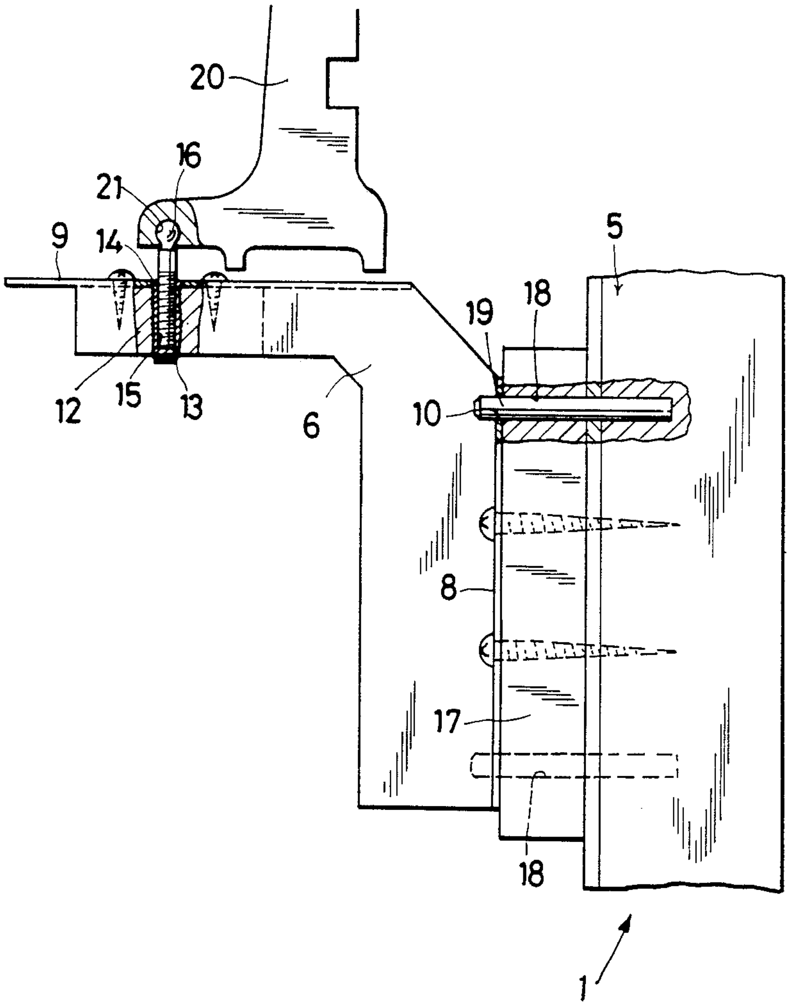
FIG. 3 is a side view, partly in section, of an action supporting member portion thereof.
Figure 4:
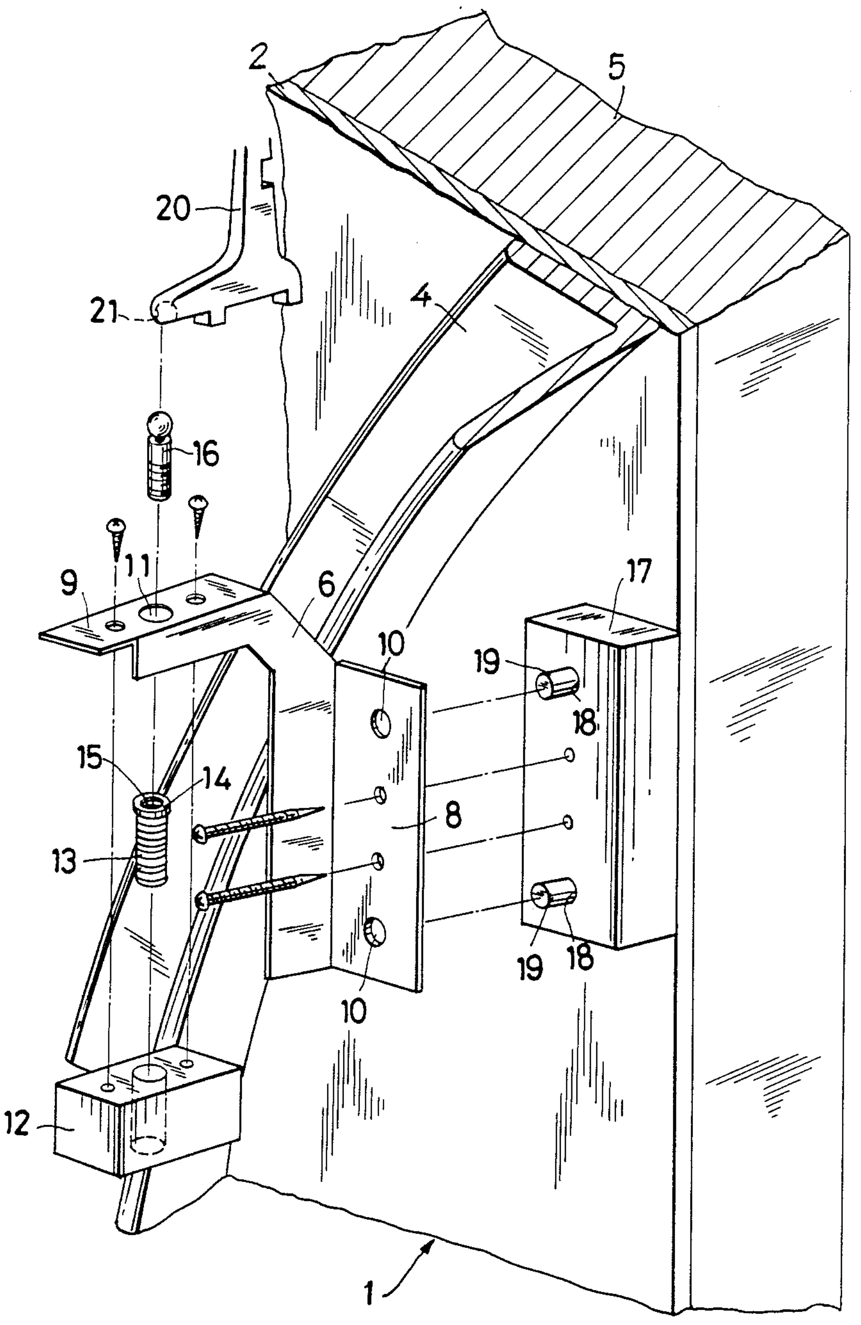
FIG. 4 is an exploded perspective view of FIG. 3.

One embodying example of this invention will be explained with reference to the accompanying drawings:

Referring to FIGS. 2 to 4, numeral 1 denotes a back structure including a soundboard 2 attached to laterally spaced back posts 5 formed a sound absorbent materal, and upper and lower beams, and other elements. Numeral 4 denotes a cast frame applied with strings 3 and attached to the back structure 1. A pair of right and left action-supporting members 6, 6 are fixed to a front surface of the back posts 5, in spaced relationship with the frame 4, and an action means 7 is supported on the right and left action-supporting members 6, 6, the action means 7 being accoustically isolated from the frame, strings, bridge and sound board by sound absorbtion in the interposed posts 5.

More in detail, the action-supporting member 6 on each side is as shown clearly in FIG. 4. Namely, the supporting member 6 is a plate punched out from a metallic plate such as an iron plate or the like, and bent into an attaching portion 8 and an action-supporting portion 9. The attaching portion 8 is provided with openings 10, 10, and the action-supporting portion 9 is provided with an opening 11. An action bracket base 12 is fixed by means of screws to the action supporting portion 9 in such a way that an upper end flange portion 14 of a bushing 13 mounted in the base 12 is mounted in the opening 11. A bolt 16 is in engagement with a threaded opening 15 of the bushing 13.

A base 17 for the action supporting member 6 is attached to each of the right and left portions of the front surface of the back structure 1 in alignment with the back posts 5. The base 17 is provided with reference openings 18, 18 which receive reference pins 19, 19 mounted in the back post 5. Then, the attaching portion 8 of the action-supporting member 6 is mounted on the reference pins 19, 19 and is attached to the base 17 by means of screws. A concavity 21 in a lower portion of a support bracket 20, one of which is provided on each end of the action means 7, is positioned on a top portion of the bolt 16. The elevation of the action means 7 can then be set easily and with a high degree of accuracy in relation to the back structure 1 by turning the bolt 16 relative to its threaded bushing 13. The upper end of support bracket 20 is supported by a post 30 fast with the back structure 1 in such a manner that vertical movement of the support bracket 20 during adjustment of the action means 7 is permitted.

Referring to FIG. 2, numeral 23 denotes a keyboard unit, a key bed 24 and a keyboard 25. This unit is priorly prepared with the keys of the keyboard 25 adjusted so that the keys thereof are in the same plane one with another under the respective conditions that they are depressed and that they are released.

Numeral 26 denotes an end panel to be attached to each side of the back structure 1, and numeral 27 denotes an arm connected to each of the end panels 26, 26. Each end panel 26 is fixed in a predetermined position relative to the back structure 1 in such a manner that reference openings made therein are overlapped with corresponding reference openings made in the back structure 1. Additionally, the arm 27 of each end panel 26 is provided on its inner side surface with a horizontally extending member 28. The keyboard unit 23 is bridged between and attached to the right and left members 28 in such a manner that reference openings made in the former are overlapped with corresponding reference openings made in the latter.

The order of assembly of the piano is that dampers and hammers are attached to the action means 7, and adjustment between the action means 7 and the strings 3 is carried out. The end panels 26, 26 are then attached to the back structure 1, keyboard unit 23 is attached to the arms 27, 27. Thereafter, casing members (not illustrated) such as an upper front panel, a lower front panel, a top panel and others are attached to the back structure 1.

Thus, according to this invention, increased accuracy in adjustment of the position of the action means in relation to the strings is provided, vibrations and other noises produced in the action means being accoustically isolated from the frame, strings, bridge and the sound board by the damping action of the posts 5. Additionally, the assembling of the keyboard unit and the assembling of the end panels with the arms can proceed concurrently therewith, shortening manufacturing time and cost, and additionally the possibility of injuring the end panels with tools is minimized.

I claim:

1. In an action supporting arrangement for a piano, said piano having a back structure including laterally spaced vertically arranged backposts formed from a sound absorbent material, a sound board supported by the back structure, a string supporting metal frame secured to and carried by said back structure, strings carried by said metal frame, and a bridge interposed between said strings and said sound board for transmitting vibrations of said strings to said sound board, the improvement comprising:

a support bracket attached to a front surface of each of said back posts in a position spaced laterally from said metal frame;

an action mechanism including hammers carried directly by said support brackets; and adjustment means interposed between said brackets and said action mechanism for effecting accurately controllable positioning of said action mechanism relative to said strings;

whereby said action mechanism is effectively isolated from said metal frame and said strings by the interposed back posts of said piano, and vibrations produced in said action mechanism are absorbed in said back posts.

2. The action-supporting arrangement of claim 1, in which a pair of right and left end-panels having respective arms are secured to the outsiders of said respective back posts for them to be respectively spaced outwardly of the right and left action support brackets, and a keyboard for the operation of said action mechanism is supported on the right and left arms.

3. The action-supporting arrangement of claim 1, in which each action support bracket is formed from sheet metal and provides a back post attaching portion and an action supporting portion, the back post attaching portion being attached to the back post through a base, the action supporting portion being provided with a bolt attached to said action supporting portion through a bushing, said bolt supporting an action bracket base, said bolt having a head engageably mounted within a cavity in said action bracket.

* * * * *